(12) United States Patent
Garrison et al.

(10) Patent No.: US 8,266,254 B2
(45) Date of Patent: Sep. 11, 2012

(54) ALLOCATING RESOURCES IN A DISTRIBUTED COMPUTING ENVIRONMENT

(75) Inventors: John M. Garrison, Austin, TX (US); Kent F. Hayes, Jr., Chapel Hill, NC (US); Brian D. Jeffrey, Cary, NC (US); Yih-Shin Tan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 12/194,381

(22) Filed: Aug. 19, 2008

(65) Prior Publication Data
US 2010/0049851 A1 Feb. 25, 2010

(51) Int. Cl.
*G06F 15/177* (2006.01)
(52) U.S. Cl. ...................................................... 709/220
(58) Field of Classification Search .................... 709/220
See application file for complete search history.

(56) References Cited

U.S. PATENT DOCUMENTS

| | | | | |
|---|---|---|---|---|
| 5,864,338 | A * | 1/1999 | Nestor et al. | 715/201 |
| 7,013,462 | B2 * | 3/2006 | Zara et al. | 717/177 |
| 7,085,670 | B2 * | 8/2006 | Odom et al. | 702/127 |
| 7,117,195 | B2 * | 10/2006 | Chantrain et al. | 709/221 |
| 7,290,244 | B2 * | 10/2007 | Peck et al. | 717/109 |
| 7,316,009 | B2 * | 1/2008 | Peck | 717/138 |
| 7,356,679 | B1 * | 4/2008 | Le et al. | 713/1 |
| 7,478,361 | B2 * | 1/2009 | Peteanu et al. | 717/102 |
| 7,496,743 | B1 * | 2/2009 | Salazar et al. | 713/2 |
| 7,603,443 | B2 * | 10/2009 | Fong et al. | 709/220 |
| 7,757,033 | B1 * | 7/2010 | Mehrotra et al. | 710/316 |
| 7,945,888 | B2 * | 5/2011 | Adir et al. | 716/136 |
| 2005/0021688 | A1 * | 1/2005 | Felts et al. | 709/220 |
| 2005/0177635 | A1 * | 8/2005 | Schmidt et al. | 709/226 |
| 2005/0204316 | A1 * | 9/2005 | Nebel et al. | 716/2 |
| 2005/0283759 | A1 * | 12/2005 | Peteanu et al. | 717/120 |
| 2006/0080412 | A1 * | 4/2006 | Oprea et al. | 709/220 |
| 2006/0245354 | A1 * | 11/2006 | Gao et al. | 370/230 |
| 2007/0006038 | A1 * | 1/2007 | Zhou | 714/38 |
| 2007/0022351 | A1 * | 1/2007 | Zhou et al. | 714/744 |
| 2007/0061428 | A1 * | 3/2007 | Haley et al. | 709/220 |
| 2007/0245163 | A1 * | 10/2007 | Lu et al. | 713/300 |
| 2008/0256531 | A1 * | 10/2008 | Gao et al. | 717/177 |
| 2009/0171705 | A1 * | 7/2009 | Bobak et al. | 705/7 |
| 2009/0172794 | A1 * | 7/2009 | McGuire | 726/7 |
| 2009/0240724 | A1 * | 9/2009 | Das et al. | 707/102 |

OTHER PUBLICATIONS

Chase, J. et al., Managing Energy and Server Resources in Hosting Centers, 2001, ACM, ACM SIGOPS Operating Systems Review, vol. 35, Issue 5, pp. 103-116.*

* cited by examiner

*Primary Examiner* — Wing Chan
*Assistant Examiner* — Alicia Baturay
(74) *Attorney, Agent, or Firm* — Steven L. Nichols; Van Cott, Bagley, Cornwall & McCarthy P.C.

(57) ABSTRACT

A solution in a distributed computing environment is deployed and includes selecting a solution template corresponding to the solution, the solution template defining requirements for a plurality of computing elements; selecting resources within a computing infrastructure which match the requirements; and deploying the solution by configuring the resources according to the solution template.

18 Claims, 7 Drawing Sheets

AOB ENVIRONMENT

PROFILE | SIGN OUT | HELP

RESERVATION — 305

310 — SOLUTION [1152]   LAYER [140]   SOU PATTERN [WAS 6.1 - 8G] — 345

RESERVATION START DATE [9/15/09] — 350   RESERVATION START DATE [1/15/10] — 360

340

315 — AVAILABLE RESOURCES

| PHYSICAL HOST | LOCATION | COST/MONTH | UTILIZATION | PERFORMANCE | GREEN SCORE 320 |
|---|---|---|---|---|---|
| P1028-002 | ORLEANS, FRANCE | $ 555 | 25% AVE: 50% MAX | 505 MS LATENCY | 🌿🌿🌿 |
| P595-0101 | AUSTIN, TX, USA | $ 535 | 30% AVE: 60% MAX | 62 MS LATENCY | 🌿🌿 |
| X3012-756 | KIRKLAND, WA, USA | $ 500 | 40% AVE: 70% MAX | 160 MS LATENCY | 🌿🌿 |
| I3140-978 | BEIJING, CHINA | $ 496 | 10% AVE: 55% MAX | 328 MS LATENCY | 🌿 |

325

CRITERIA DETAILS: GREEN SCORE FOR P1028-002 HOSTING WAS 6.1 - 8G

| ENERGY SOURCE | RENEWABLE = 11% | ENERGY CONSUMPTION | IDLE = 6.2 KW/DAY |
| | NUCLEAR = 33% | | 80% UTILIZATION = 8.5 KW/DAY |
| | 1.3 LBS CARBON/KWH | CARBON FOOTPRINT | IDLE = 8 LBS CARBON/DAY |
| | | | 80% UTILIZATION = 11 LBS CARBON/DAY |

○ ABO SOLUTION PRICING REPORT                                               PROFILE | SIGN OUT | HELP

SOLUTION TEMPLATE

SOLUTION: 1152                APPLICATION: 2009 HOLIDAY CAMPAIGN

COMPARISON OF DEPLOYMENT PLANS

| DEPLOYMENT PLAN | MONTHLY COST | QOE SCORE | POWER USAGE (KWH/MONTH) | CARBON GENERATION (LBS/MONTH) |
|---|---|---|---|---|
| #1 LOWEST POWER: | $ 73,390 | 89 | 1295 | 2430 |
| #2 BEST QOS: | $ 76,890 | 95 | 1490 | 1937 |
| #3 LOWEST COST: | $ 67,050 | 78 | 1350 | 1942 |

FIG. 5

ALLOCATING RESOURCES IN A DISTRIBUTED COMPUTING ENVIRONMENT

BACKGROUND OF THE INVENTION

In a distributed computing environment, multiple physical and software resources are combined and interconnected to support one or more applications. Consequently, planning, deploying, and managing a solution or application within a distributed computing environment can be challenging. In many cases, deploying a new application is a time consuming and error prone process that must be repeated for each software deployment.

To deploy a new application in a distributed computing environment, appropriate software images, hardware, storage and network resources must be identified. Additionally the topology must be designed, work load characteristics collected and performance expectations defined. Where an application is relocated or redeployed, the entire process is repeated.

BRIEF SUMMARY OF THE INVENTION

A method for deploying a solution in a distributed computing environment includes selecting a solution template corresponding to the solution, the solution template defining requirements for a plurality of computing elements; selecting resources within a computing infrastructure which match the requirements; and deploying the solution by configuring the resources according to the solution template. A system for allocating resources in a distributed computing environment includes a database of solution templates, the solution template specifying resources needed for a desired solution to be deployed; and a user interface supported by a computing device for accessing the database and selecting a solution template.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 3 is an illustration of software which shows a reservation method for selecting and reserving various physical resources within a distributed computing system, according to one embodiment of principles described herein.

FIG. 5 is an illustration of software which shows the total monthly costs for a variety of deployment plans hosted within a distributed computing system, according to one embodiment of principles described herein.

Throughout the drawings, identical reference numbers designate similar, but not necessarily identical, elements.

DETAILED DESCRIPTION OF THE INVENTION

Figure 1:
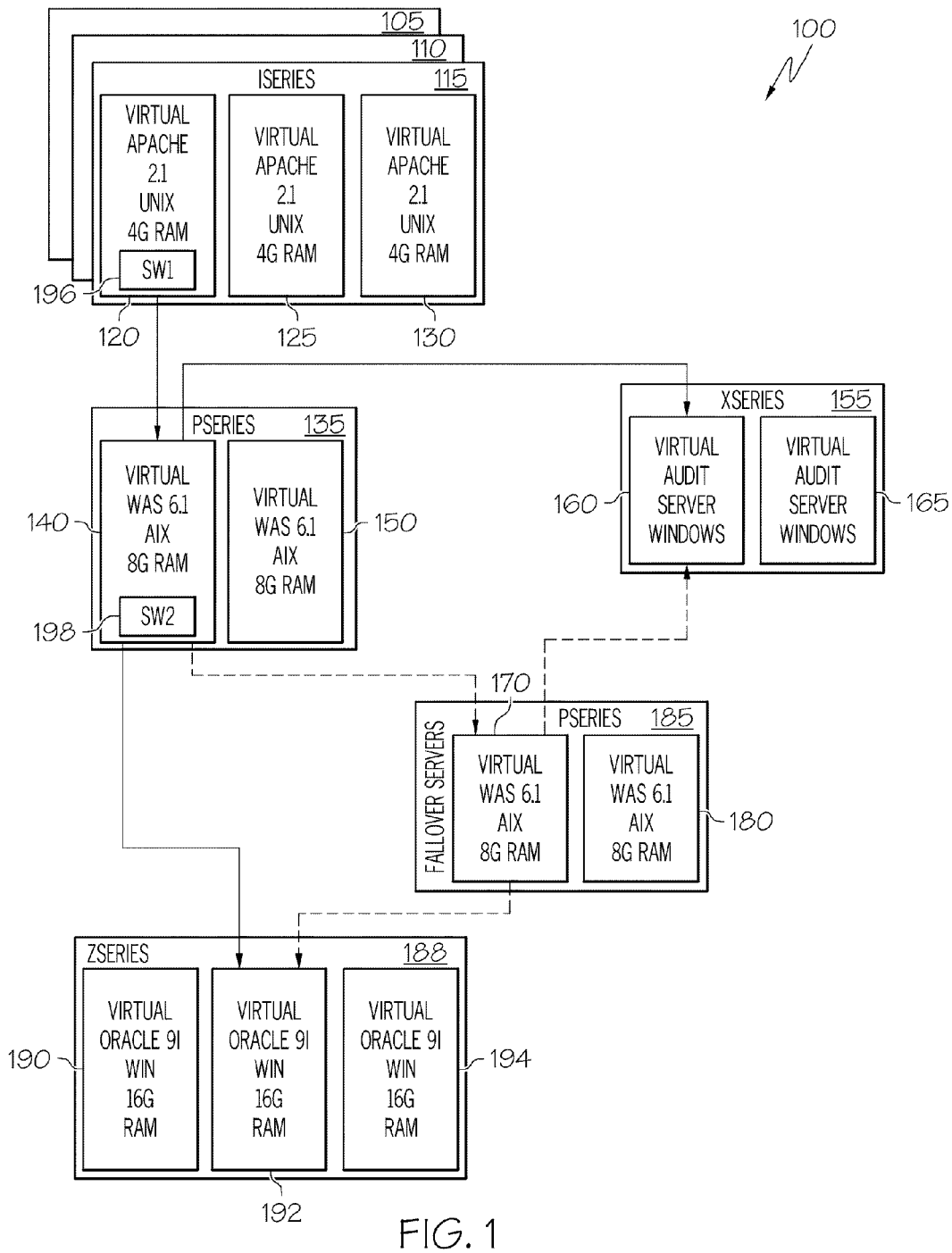
FIG. 1 is a diagram of an illustrative distributed computing system hosting a virtualized application, according to one embodiment of principles described herein.

The present specification relates in general to distributed computing environments. More specifically, the present specification describes an illustrative method for planning, deploying, and managing a standard operating unit based system within a distributed computing environment. For example, in a distributed computing environment, a user may need to institute a new functionality, such as an application or website. The illustrative method described in the following specification can assist the user in identifying what elements of a computing environment are needed to support the new functionality, identify corresponding elements available in the existing computing environment, select specific elements among alternatives in the existing computing environment based on various criteria and reserve use of those elements to support the new functionality. Specific examples of this advantageous method will be described in detail below.

Distributed computing environments include hardware and software systems containing multiple computing elements that interact cooperatively to accomplish one or more functions. Distributed computing environments are typically formed by a number of physical computing resources (such as processors, random access memory, disk storage, etc.) which are configured to communicate over one or more networks. In a distributed computing environment, multiple hardware and software resources are combined to perform functions in a transparent, open, and scalable manner. Many distributed computing environments are more fault tolerant, capable, and powerful than stand-alone computer systems.

The physical computing resources of a distributed computing environment are allocated according to the needs of the applications or users being supported. This allocation process is one form of virtualization of computer resources. Virtualization is a framework or methodology of dividing physical computing resources into multiple execution environments. This can be accomplished by applying one or more concepts or technologies such as hardware and software partitioning, time-sharing, partial or complete machine simulation, emulation, and others.

Virtualization is often used to hide the actual physical characteristics of computer resources from the user or application. For example, a single physical resource, such as a server, may be divided into several virtual machines which appear to operate independently and perform different functions. Additionally, virtualization may make the combination of multiple physical resources appear as a single virtual resource. For example, a first physical server may provide a web interface to a user, while a second physical application server provides functionality underlying the web interface, and a third server supports a database which is accessed by the physical application server. The users are unaware that three physical machines are supporting their use of the web interface and its functionality. Ideally the virtualization of the distributed computing environment seamlessly creates the required combination of computing resources to support the functionality desired by the user.

As used herein and in the appended claims, the term "computing element" includes both physical and virtual elements of a computing environment. The term "resource" is used broadly to refer to any computing element that performs a function or serves as a component in a solution or functionality being implemented.

A fundamental task for an organization is to plan, deploy, and manage various applications that support the organization's needs. Planning can involve defining the function and scope of the desired application, identifying resources required to support the application, and estimating the time and cost of implementing the application. This planning process may require that appropriate software images be identified, network topology designed, work load characteristics collected, and performance expectations defined. The actual deployment of an application is often a trial-and-error process that continues even after the deadline for having the application operational has past. The management and monitoring of runtime parameters can require tapping into application and machine interfaces. Where an application is relocated or redeployed, the entire process must be repeated. All of the above steps require a deep knowledge of the underlying resources, applications, and deployment procedure. Further, the complexity of a virtualized application and the distributed computing environment can lead to numerous errors during the deployment process. Consequently, the deployment or redeployment of an application can be time consuming and expensive.

To address these issues, the present specification describes an illustrative method for planning, deploying, and managing a standard operating unit based system within a distributed computing computer environment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As noted above, the present specification describes a method for planning, deploying, and managing a standard operating unit based system within a distributed computing computer environment. According to one illustrative embodiment, a solution template can be used to define, consolidate, and simplify tasks and problems associated with deploying a software application in a distributed computing environment.

A solution template is a structured methodology that defines both a procedure and structure for deploying an application in a distributed computing environment. A solution template which closely matches the needs of an organization may be selected from a library of solution templates. Because of the standardized and modular nature of the solution template, it can serve as the basis for accurate estimates of costs, required resources, and the time required to deploy an application. Additionally, because a solution template uses standard components and has been previously vetted, the likelihood of errors or unexpected challenges is minimized.

FIG. 1 is a diagram of one illustrative embodiment of a distributed computing environment (100) hosting a virtualized application. The distributed computing environment (100) consists of a number of physical resources (105, 110, 115, 135, 155, 185, 188) which are interconnected by a network or are otherwise in communication with other physical resources. By way of example and not limitation, these physical resources could be servers, such as an IBM® pSeries® server or an Intel® processor based xSeries® server (IBM, pSeries and xSeries are registered trademarks of International Business Machines Corporation in the United States, other countries, or both; Intel is a registered trademark of Intel Corporation in the United States, other countries, or both). Additionally these servers may run a variety of operating systems, such as Linux®, Novell® UNIX®, Microsoft® Windows®, or other similar operating systems (Linux is a registered trademark of Linus Torvales in the United States, other countries, or both; Novell and UNIX are registered trademarks of Novell Corporation in the United States, other countries, or both; and Microsoft and Windows are registered trademarks of Microsoft Corporation in the United States, other countries, or both). For example, a first group of physical servers (105, 110, 115) may be iSeries servers running UNIX operating system.

According to one illustrative embodiment, each of the physical resources is configured according to a solution template which is comprised of a number of standard operating units (SOUs). The various physical resources are divided into various virtual machines according to an SOU pattern. An SOU pattern contains a number of characteristics or requirements that define a physical computing resource or portion of a physical computing resource that is required to accomplish a particular function.

For example, an iSeries server (115) may contain 12 Gigabytes (GB) of Random Access Memory (RAM) and three processor cores operating at 3 GHz. This computational capability and memory capacity may be divided into three virtual machines (120, 125, 130). In this example, each of the virtual machines comprises one of the three processor cores and one third of the total RAM contained in the physical machine. This would comply with an SOU definition which calls out a virtual machine with 3 GHz processor and 4 GB of RAM.

These virtual machines (120, 125, 130) can act as independent computational entities. For example, virtual machines running on the same physical resource may utilize dissimilar operating systems or support different applications. According to one illustrative embodiment, the virtual machines (120, 125, 130) each provide the functionality of an Apache 2.1 HTTP server on a UNIX based operating system. Thus, one physical computing system (115) can host a number of virtual machines (120, 125, 130), each of which may be a Web Server. Similarly, other physical resources (135, 155, 185, 188) may be divided into virtual machines that host various operating systems and applications. By way of example and not limitation, second physical resource (135) may host Web Application Servers (WAS) (140, 150) using an Advanced Interactive eXecutive (AIX®) operating system (AIX is a registered trademark of International Business Machines Corporation in the United States, other countries, or both). A third physical resource (155) may host a custom application such as virtual audit servers (160, 165) on a Windows operating system. A fourth physical resource (188) hosts three virtual Oracle® 9i database servers (190, 192, 194) (Oracle is a registered trademark of Oracle Corporation in the United States, other countries, or both).

Various virtual machines cooperate according to a solution template to support a desired application or solution. For example, an organization may wish to implement a holiday marketing or sales campaign. The holiday campaign may include a specific business application for example a web based interface that allows viewers to interact with underlying website functionality (i.e. to view and purchase products on sale). Using a solution template for that particular class of web accessible business applications, the various SOUs involved could be identified and corresponding virtual machines created on various physical resources.

According to one illustrative embodiment, a first Virtual Apache Web server (120) may host the web interface for the campaign application (196). The functionality underlying this website is supported by a virtual Web Application Server (WAS) running on an AIX operating system (140) that is running an application (SW2) (198). The virtual WAS (140) accesses a database (192) that is supported by a virtual Oracle 9i application running on a Windows operating system. There may be any number of other computing elements which are integrated into the virtualized computing infrastructure. One example may be a virtual audit machine (155) which supports a virtual audit server (160) running on a Windows operating system.

The web application server (140) retrieves inventory and customer data from the Oracle database (192) and performs the requested calculations to support the functionality of the campaign application. Because the campaign application delivers mission critical results to the organization, a passive primary physical machine (185) has been placed in a second location. The passive primary machine (185) is divided into a number of virtual web application servers (170, 180). A first virtual server (170) can communicate with the virtual audit server (160), the Apache web server (120) and the virtual database (192). In the event that there is a disruption which prevents the active primary machine (135) from communicating or performing, the passive primary machine (185) can serve as a failover, thereby maintaining the mission critical function.

In the example illustrated in FIG. 1, a first software component, "SW1" (FIG. 1, 196) is a web server software instance that forms the interface that provides user access for the campaign application. A second software component "SW2" (FIG. 1, 198) operates on a virtual web application server and provides the underlying functionality to the web server software. A number of other software components could be used within the system. For example, various operating systems and middleware may be installed on the virtual machines.

Figure 2:
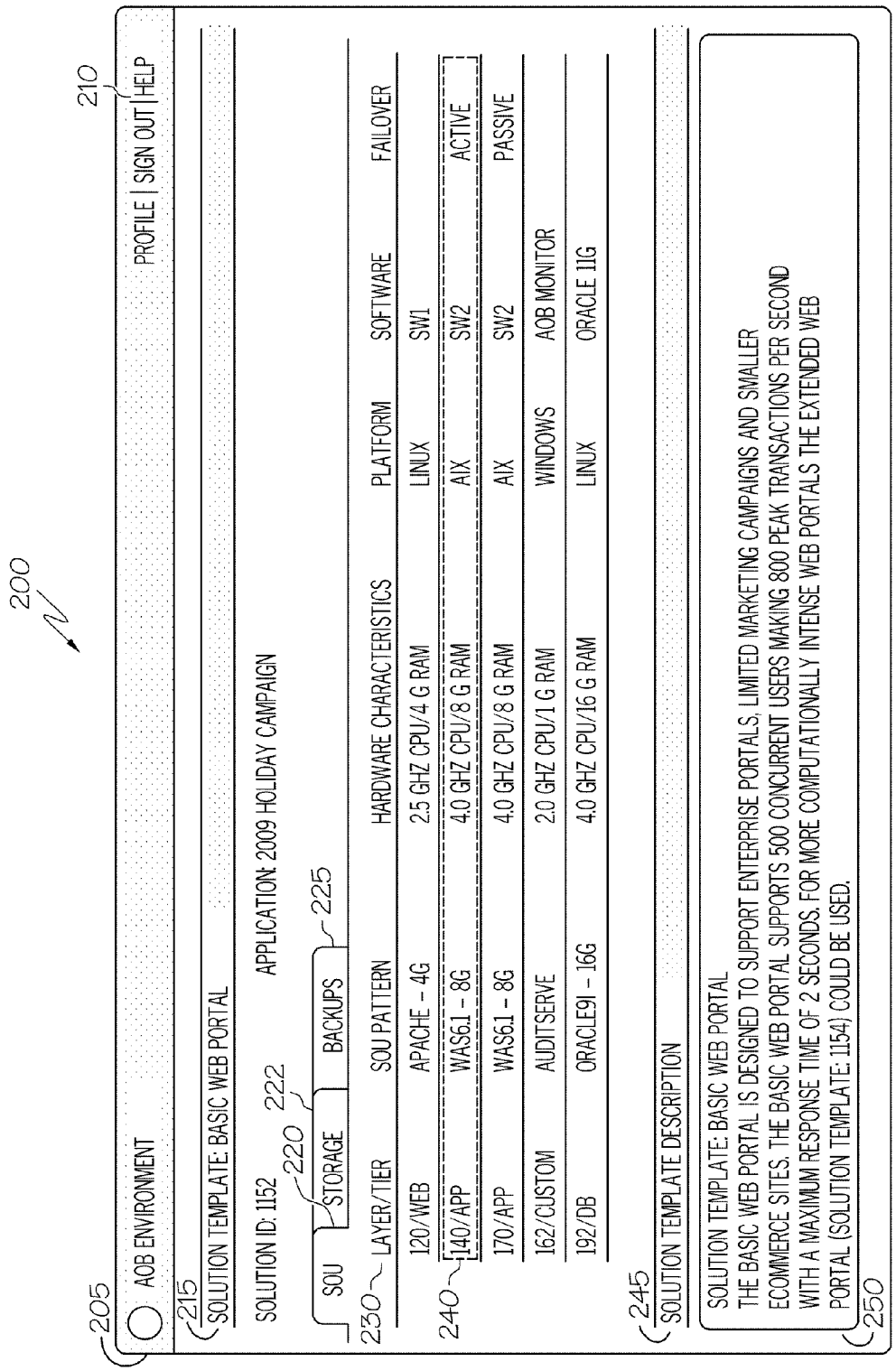
FIG. 2 is an illustration of software which shows a solution template and its constituent parts, according to one embodiment of principles described herein.

FIG. 2 is an illustrative screenshot (200) which shows a solution template and its constituent parts. As mentioned above, a solution template is a structured methodology that defines both a procedure and structure for deploying, redeploying or relocating a software solution or class of software solutions. According to one illustrative embodiment, when an organization is planning to implement a new operation or functionality in a distributed computing environment, they may select a solution template that matches their particular needs. A number of solution templates may be available in a library. The solution templates contain a detailed plan for allocating computing resources to accomplish a particular operation or support a desired functionality.

FIG. 2 represents an illustrative description of a solution template (215) which is designated as a "Basic Web Portal." According to one embodiment, the screenshot (200) includes a title bar (205) which identifies the section of the software which is currently being viewed. The title bar (205) may also include a number of functions (210) which facilitate the use of the software by the user. In the example illustrated in FIG. 2, the solution template is identified by a solution ID "1152." In this situation, the solution template defines a solution that will support a "2009 Holiday Campaign" virtualized application.

The solution template consolidates and simplifies tasks and problems associated with deploying a software application by defining a system comprised of a number of computer elements. These computer elements may be virtual or physical machines, disk space, software components, networks, routers, etc. The solution template allows available physical resources to be identified, compared, selected, and reserved. Because the solution template has a predefined structure and requirements, the costs associated with a deployment can be easily and accurately estimated. Additionally, a solution template may provide for monitoring and adjustment of a solution during deployment. Further, because of the standardized nature of solutions that follow a solution template, the maintenance, redeployment or relocation of a solution is simplified.

In many cases, a solution template comprises a number of standard operating unit (SOU) patterns. As described above, an SOU is a standardized definition for virtual or physical machine which has a predetermined configuration suitable for supporting a given component of the "2009 Holiday Campaign" application. An SOU pattern contains a number of characteristics or requirements that define a physical computing resource or portion of a physical computing resource that is used to accomplish a particular function within a solution template. For example, an SOU pattern may define computer processing unit (CPU) requirements, random access memory (RAM) requirements, storage, and network capabilities. These characteristics can be used to identify physical resources within an organizational infrastructure which support the SOU functionality. Additionally, an SOU may call out a predefined, standard image for an operating system and appropriate patches. To accomplish an SOU's particular function within a software template, the SOU may also call out task-specific software such as database server, application server, or web server software.

A number of tabs (220, 222, 225) provide details about the solution template guidelines. For example, a first tab (220) describes the SOUs which make up constituent computing elements of the solution template. As illustrated in FIG. 1, each of these elements may be a virtual machine created by dividing the resources of a physical machine into one or more virtual machines. Additionally or alternatively, a portion of the virtual machines may be formed by combining the resources of one or more physical machines into a virtual machine.

According to one illustrative embodiment, a sub-header (230) lists a number of characteristics associated with each SOU. The first column "Layer/Tier" provides a numeric identifier for the specific computing element and the basic functionality, or tier, of the computing element. A second column lists the SOU pattern that forms the basis of the characteristics for each SOU computing element. One of the key characteristics defined by each SOU pattern is the hardware characteristics listed in the third column. The operation system for each of the SOU computing elements is listed under the heading "Platform." The software that provides the specific functionality desired by each SOU element is listed in the "Software" column. A final column lists recommended redundancies for various SOU computing elements.

For example, a second SOU computing element is enclosed by a dashed box (240). This computing element is identified as a virtual machine "140" (see FIG. 1) which is in the application tier of the solution template. The virtual machine "140" is defined by the SOU pattern "WAS 6.1-8G." The SOU pattern "WAS 6.1-8G" calls out a central processing unit (CPU) which operates at 4.0 Gigahertz (GHz) and has access to 8 gigabytes (GB) of random access memory (RAM). The operating system for this particular virtual machine may be the AIX operating system. The virtual machine runs an instance of a software package "SW2" and is the active computing element in a pair of identical SOU computing elements. In the event that active virtual machine "140" is inoperable or is otherwise unable to carry out its assigned functions, the passive virtual machine "170" will step out of its role as a passive component to fulfill the assigned functions.

The other tabs (222, 225) may display similar information about other aspects of the solution template. For example, a "Storage" tab (222) may convey information about the amount and type of disk or other storage that is made available to the various computing elements. This information may include the capacity of the disk storage, acceptable read/write times, and communication bus requirements. A third "Backups" tab (225) may define frequency of backups and the amount of storage required for the backups. These additional tabs and their contents are only examples of a few of the possible characteristics of a solution template. A variety of other characteristics could be included to assist an organization in selecting and implementing a solution template. By way of example and not limitation, a network tab could be included. The network tab could list connection types and speeds that are required/recommended between each of the SOU computing elements or between the SOU computing elements and outside entities.

In this illustrative embodiment, a solution template description (245) provides additional information about the solution template and functions that it is designed to support. For example, a text box (250) describes the "Basic Web Portal" as supporting "enterprise portals, limited marketing campaigns, and smaller ecommerce sites." Additional detail about the number of users, peak transactions, and maximum response time is also given in the description.

Solution templates can be devised for different target environments. For example, solution templates could be designed for high availability production configurations with clustered application servers that support continuous operation, large scale production configurations that support large workloads and are extremely scalable, or disaster recovery implementations that are functionally equivalent to the production environment with hot failover capability.

After the organization has selected a given solution template, the various SOU patterns and other elements which make up the solution template can be identified from the infrastructure available to the organization. FIG. 3 is an illustration of software (300) which provides for a comparison of available physical resources which match a given SOU pattern and a reservation method for reserving the selected physical resources.

A number of data fields identify the solution template (310), the computing element (340), the SOU Pattern (345), and the starting date (350) and end date (360) of the desired reservation time period. Using these parameters, the software searches the available computing infrastructure for available resources (315). In the example shown in FIG. 3, there are four available resources which can host a virtual machine which complies with the SOU pattern "WAS 6.1-8G" during the reservation time period. For example, a first available physical host, "p1028-002" is located in Orleans, France. This host has a cost of $555 per month. The system may also retrieve or calculate historical utilization or performance figures for the physical host. For example, the utilization of the physical host as a percent of total capacity could be retrieved from a monitoring database. As illustrated in FIG. 3, the physical host "p1028-002" has an average utilization of 25% and a maximum utilization of 50%. Reserving the excess capacity of this physical host to support the "WAS 6.1-8G" SOU pattern will increase the utilization of this physical host, thereby more effectively utilizing the existing resources of the infrastructure. Additionally, various performance parameters, such as communication latency could be measured to provide addition information about the suitability of a physical host. While a measure of a current communication latency time period is not a guarantee of future communication latencies, it can provide a basis for estimating the responsiveness of a given host.

A green score may also be provided to allow the various environmental impacts of the physical hosts to be compared. By way of example and not limitation, a green score may be a composite of a number of environmental factors, such as the source of electrical energy consumed by a given physical resource, the energy consumption/efficiency of a resource, and the carbon footprint of a resource. In the example illustrated in FIG. 3, the green score is illustrated as a number of leaf icons (325). Physical resources which are judged to have greener operating characteristics are identified by a larger numbers of leaf icons, while resources which have a greater negative environmental impact have fewer leaf icons.

In one embodiment, the list of available resources can be sorted or filtered by any of the criteria. For example, the list of available resource could be sorted in order of ascending cost, with the lowest cost available resources being listed first. Additionally or alternatively, the available resources could be sorted by performance, utilization, green score or other characteristics. In situations where there are a large number of available resources, these filtering and sorting techniques can assist a user in pinpointing a resource with the desired characteristics.

According to one illustrative embodiment, any one of the characteristics listed for an available resource can be selected to display additional information in a "Criteria Details" box (330). For example, if the leaf icons associated with physical host "p1028-002" are selected, details about the various environmental factors which make up the green score are displayed. Similarly, if the cost per month of a physical host were selected, the various financial details such as depreciation, maintenance costs, energy consumption, and licenses may be displayed. These details give additional insight into the criteria listed and allow an organization or individual to make a more educated selection of the various available resources.

Figure 4:
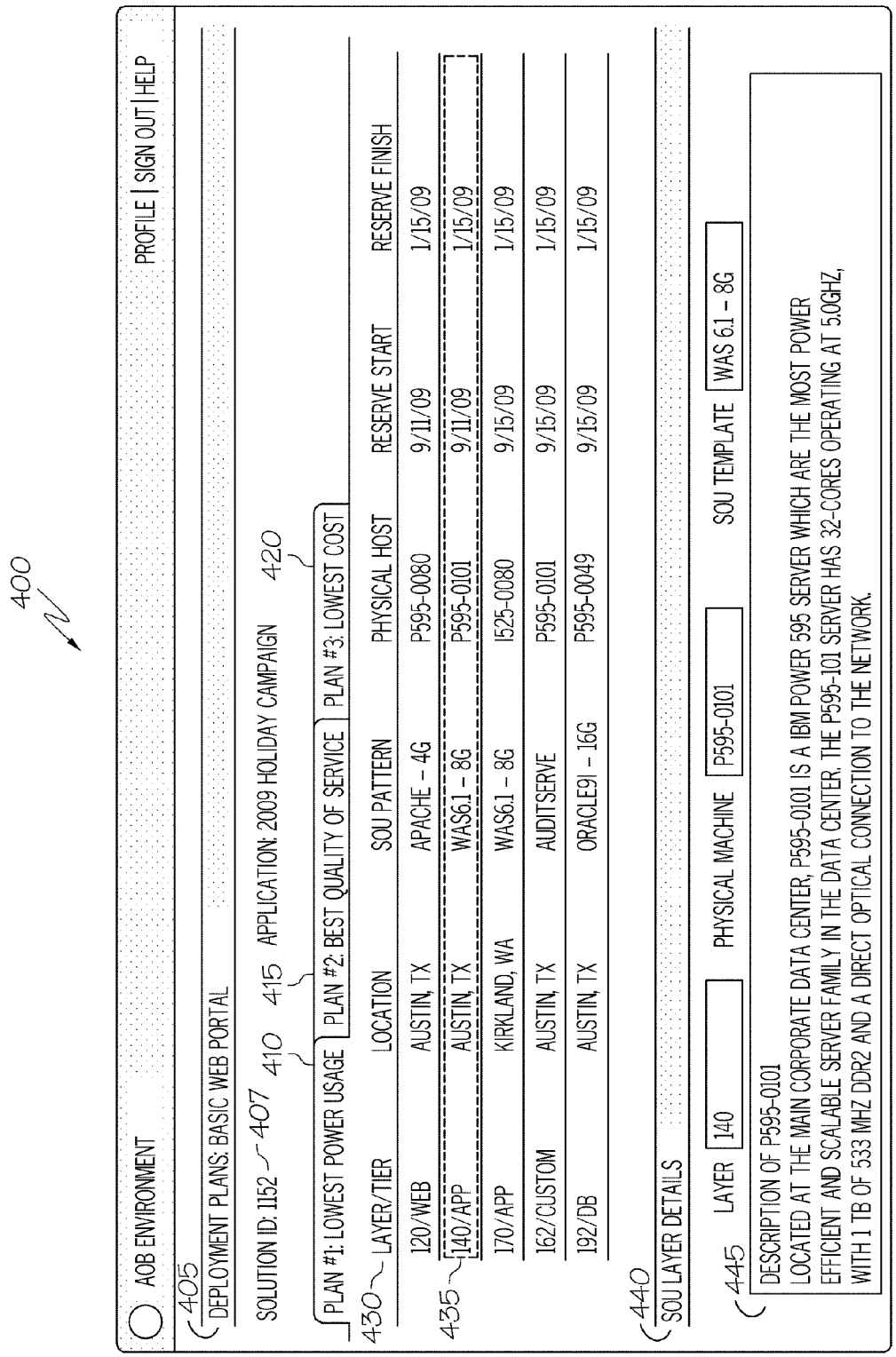
FIG. 4 is an illustration of software which shows a variety of deployment plans that follow a solution template, according to one embodiment of principles described herein.

In some instances, an IT professional may desire to make and save one or more deployment plans which implement a given solution template. These deployment plans may be optimized for one or more characteristics such as electrical power usage, quality of service, or cost. FIG. 4 is an illustration of a number of deployment plans (410, 415, 420) which follow a solution template (407). According to one illustrative embodiment, a first deployment plan (410) is optimized for low power consumption. Various physical resources have been selected from the computing infrastructure that are more efficient in utilizing electrical power to produce the desired functionality. For example, newer computing devices may have more efficient CPUs and require less energy for cooling than older computing devices. The dashed box (435) highlights an SOU layer "140/App" which is supported by a physical host "p595-0101." A portion of this physical host's resources needed to implement the "WAS 6.1-8G" SOU pattern have been reserved from a reservation start date "Sep. 11, 2009" to a reservation finish date "Jan. 15, 2009."

By providing for the scheduling and reservation of physical resources, the resource pool of an organization can be more efficiently used and managed. Further, where managers or decision makers are uneasy about lacking control over virtualized resources in distant locations, the reservation process can provide assurance that the physical resources are committed to the manger's application for the desired period of time. Additionally, the reservation process may make budgeting and billing more straightforward. The time period and amount of utilization are predefined in the solution template, SOU patterns, and reservation. Thus, the cost of the resources can be predicted and appropriately billed.

Details about the highlighted physical host are displayed in a text box (445) under the "SOU Layer Details" heading (440). The text box (445) provides additional details about the SOU layer including information about the physical host.

To provide for a comparison between various deployment plans, various characteristics of the plans can be calculated and displayed. FIG. 5 is an illustration of software module for comparing total monthly costs for a variety of deployment plans hosted within a distributed computing system. In FIG. 5, a header (505) identifies the solution template which forms a basis for the various deployment plans and the application that the solution template has been selected to support. In the example illustrated in FIG. 5, a variety of characteristics (510) are shown for the various deployment plans (515). It is understood that any number of characteristics could be shown for a deployment plan to assist an organization in comparing various deployment plans. These characteristics may include a monthly monetary cost, a Quality of Experience (QoE) score, a power usage cost, and a carbon generation cost. For example, the deployment plan labeled "#1 Lowest Power" is illustrated as having a monthly cost of $73,390, a QoE score of 89, a power usage of 1295 kilowatt hours (kWh) per month and a carbon generation of 2430 lbs. per month.

The monthly cost can be calculated by summing the costs of the component parts within the solution template. For example, the costs of the various SOU instances, the disk space, software licenses, and other components could be added together to arrive at a total monthly cost. By using a solution template, the cost of implementing a new application or function can be more quickly and easily estimated. Further, if a particular solution template has been used previously by an organization, the actual cost of the prior deployment can be leveraged for a more accurate estimate.

The QoE score may be a composite of a number of characteristics and collective behavior of the proposed system. For example, the QoE score may account for: the reliability of the system, the response time for various requests, excess capacity to absorb increases in demand, built in redundancies, communication performance and other factors. In the broadest sense, the QoE score may reflect the total integrity of the system. According to one illustrative example, a high QoE score may reflect a system with a high integrity and robustness, while a lower QoE score may indicate a less robust system with higher risks of malfunction or underperformance.

The total power usage of a deployment plan can be estimated by taking into account the documented power consumption of various components, cooling and heating requirements, and other factors. The carbon generation can be calculated by multiplying the total monthly power consumption in kilowatts by the number of pounds of carbon generated during the production of the consumed power. For example, in locations where electricity is generated entirely from fossil fuels, an average of two pounds of carbon may be generated for each kilowatt of power produced. In other areas where a substantial amount of power is generated using renewable resources or nuclear generators, only 1.3 pounds of carbon may be generated for each kilowatt of power produced.

As organizations become more aware of environmental factors, the power usage and carbon generation produced as a result of their operations can be increasingly important factors in making decision about how to optimally deploy their resources. Other environmental factors may also be considered such as optimizing the usage of current resources so that additional resources are not required to be manufactured or purchased. Calculating and displaying various parameters such as current usage of physical resources, power usage, and carbon generation can assist decision makers in gaining a holistic understanding the impact of a deployment of a new functionality.

Figure 6:
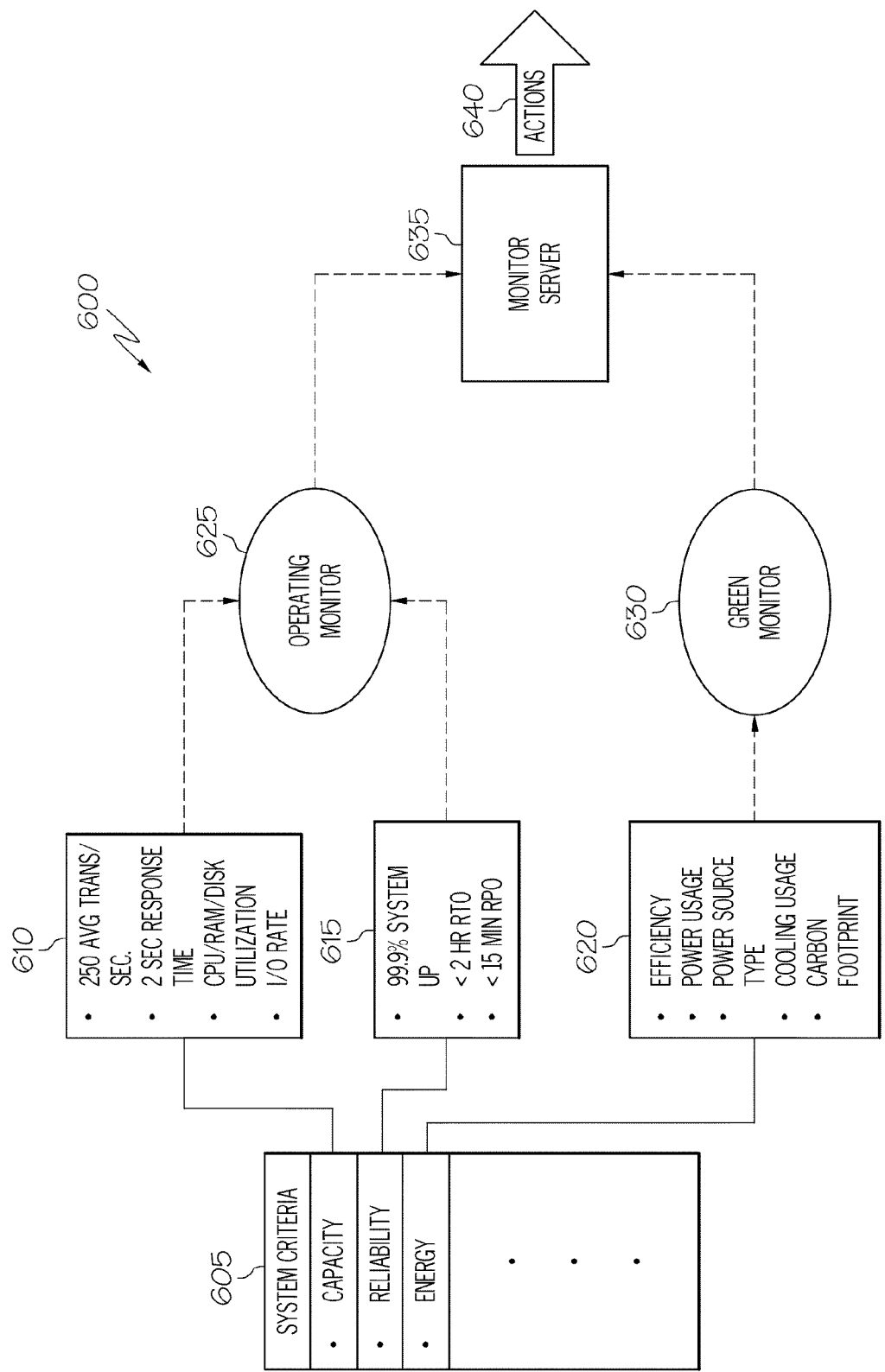
FIG. 6 is a block diagram showing an illustrative system for monitoring an application and its supporting infrastructure, according to one embodiment of principles described herein.

FIG. 6 is a block diagram (600) showing an illustrative system for monitoring a virtualized system within a distributed computing environment. The monitoring of the system allows for ongoing optimization, the measurement of actual costs, and monitoring of actual performance.

In one illustrative embodiment, the solution template may provide for monitoring capabilities. These monitoring capabilities may be configured to meet the needs of the organization by selecting which criteria to monitor, what ranges are acceptable for each criteria, and what action to take when a criteria is found to have departed from the acceptable range. In an alternative embodiment, the organization may use an existing monitoring system or create a monitoring system. In situations where a solution template is used to create the solution that is being monitored, the acceptable ranges and appropriate actions may be predefined. Further, complex actions, such as bringing an additional SOU online to assist an overburdened computing element, can be an automated.

According to one embodiment, a number of system criteria (605) can be monitored during the deployment. These system criteria (605) may include capacity, reliability, and energy criteria. The system criteria may be broken down into a number of sub-factors (610, 615, 620). For example, the reliability sub-factors (615) may include a goal for the system to be operational for 99.9% of the time, a Recovery Time Objective (RTO) in less than two hours after a disaster, and a Recovery Point Objective (RPO) of less than 15 minutes. In combination, these factors may define the robustness of the system in response to a disaster. Monitored energy sub-factors (620) may include efficiency in converting energy into function, power usage, power source type, energy used for cooling, and the carbon footprint of the system.

These sub-factors are tracked by one or more monitors (625, 630). According to one embodiment, the monitors are segments of software code within the system that record and report a variety of data to a monitor server (635). In other embodiments, the monitors (625, 630) may be any type of software, hardware, and/or data acquisition system which is configured to track and report data. The monitor server (635) is a centralized server where all monitored runtime data can be accumulated and analyzed as a whole. According to one illustrative embodiment, the monitor server (635) contains a single or composite analytic logic processor which receives the accumulated data. The logic processor triggers various actions (640) in response to data it receives. By way of example and not limitation, these actions (640) may include notifying information technology personnel of the status of various system elements, reallocating resources, re-routing information flows, bringing additional resources online, etc. The use of a solution template to deploy a solution provides the monitoring server with an extensible pattern which can be used to make adjustments based on real time events. For example, the monitor server (635) may balance server utilization and energy consumption by observing transaction rates and response times. If additional resources are required, a computing element that corresponds to the overburdened SOU can be brought online to improve the performance of the overall solution. Other examples of actions that could be taken by the monitoring server (635) include automatically skewing the workload to the higher efficiency servers or reducing the workload of a server which is operating near its upper temperature limit.

The use of solution templates and SOU patterns allows for more generic and robust monitoring algorithms to be more generally applicable and consistently used. The monitoring algorithms no longer need to be application specific but can operate based on solution template/SOU patterns.

In general, the use of solution templates and SOUs to standardize the deployment of new applications can yield significant benefits. By way of example and not limitation, standardized deployment can ensure that there is a consistent and supportable infrastructure for the new functionality being deployed. This leads to a lower total cost of ownership and fewer deployment errors. An additional benefit of using solution templates is streamlined server lifecycle management and more accurate capacity planning. Knowledge of future requirements allows for appropriate decisions to be made with regard to server purchases, retirement of older machines, and how much remaining capacity is in the computing infrastructure. Further, management decisions can be made around deployment patterns and applications rather than the details of the physical computing infrastructure. When a solution template is utilized, referring to an application is equivalent to referring to the whole body of resources used by this application. For example, an application with its associated workload characteristics and quality of service requirements can be automatically translated into the required number of web, application, and database SOUs required to support the application.

Figure 7:
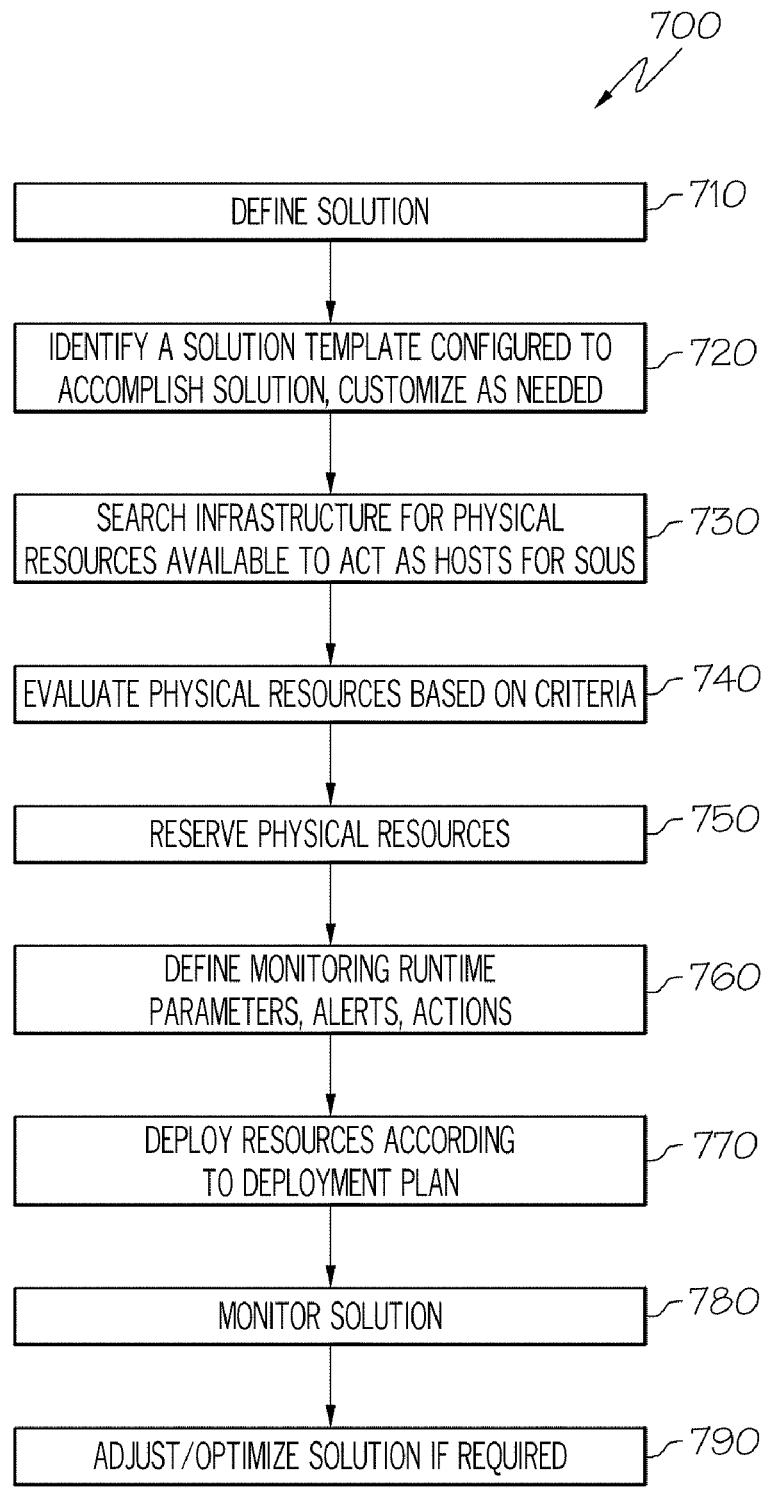
FIG. 7 is a flowchart showing an illustrative method for standard operating unit based planning, deployment, and management, according to one embodiment of principles described herein.

FIG. 7 is a flowchart showing an illustrative method for standard operating unit (SOU) based planning, deployment, and management. In a first step, an organization or individual defines a solution or new functionality which is to be fulfilled by the distributed computing environment (step 710). A solution template is then identified which is capable of performing the desired solution or functionality (step 720). The solution template is a standardized configuration with well known functional and performance characteristics that can be reused and customized. For example, if an application is relocated or redeployed, the same solution template could be reused, resulting in a significant cost and time savings. Additionally, a solution template can be customized as required for a particular situation, organization, or application. This customized solution template can then be saved and reused when a similar situation or application arises.

The infrastructure is then searched for physical resources available to act as hosts for the SOU components of the solution template (step 730). Other physical resources can be identified such as hard drive capacity and backup capabilities. The various available physical resources are then evaluated and selected based on one or more criteria (step 740). The selected physical resources are then reserved for the appropriate time period (step 750). Monitoring parameters are then defined together with appropriate ranges, alerts, and resulting actions (step 760). Any number of other steps may be taken to complete the planning and definition phase of the deployment. By way of example and not limitation, platform metrics can be defined, automations enabled, service level objectives described, and various personnel may be identified and assigned to assist in the actual deployment and monitoring process. According to one illustrative embodiment, these parameters are all gathered and maintained with the deployment plan and are associated with the particular application that the deployment plan supports.

Following the completion of the planning and definition phase of the deployment, the resources are deployed according to the deployment plan (step 770). In some circumstances, the deployment plan may exactly follow the solution template. In other cases, the deployment plan may contain any number of modifications to meet the needs and constraints within an organization and the organizational infrastructure.

The deployment is then monitored (step 780) as defined by the deployment plan or according to the existing monitoring system within the organization. The deployment can be further optimized if needed or desired (step 790) based on the results of the monitoring.

Any number of the above steps may be automated or partially automated. For example, searching the infrastructure for physical resources available to server as the specified SOUs (step 730) could be a highly automated operation. Steps that might be semi-automated might include identifying a solution template that matches the solution (step 720). To assist a user, the computer system may request a number of operating parameters and then search a solution template library for solutions that support the operating parameters. Additionally, the steps of evaluating physical resources based on criteria (step 740), reserving physical resources (step 750), deploying resources according to the solution template (step 770), monitoring runtime parameters (step 780), and adjusting the solution if required (step 790) could be automated or partially automated.

In sum, the solution template consolidates and simplifies the tasks and problems associated with deploying a new functionality, such as a software application. The solution template allows available computer components to be automatically identified, compared, selected, and reserved. Because the solution template has a predefined structure and parameters, the costs associated with a deployment can be easily and accurately estimated. Additionally, a solution template may provide for monitoring and adjustment of a solution during deployment. Further, because of the standardized nature of solutions that follow a solution template the maintenance, redeployment or relocation of a solution is simplified.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for deploying a solution in a distributed computing environment comprising:
   selecting a solution template corresponding to said solution, said solution template defining minimum eligibility requirements for a plurality of computing resources and a procedure for deploying said solution to said plurality of computing resources;
   selecting a resource within a computing infrastructure which matches at least one of said requirements; and
   deploying said solution by configuring said resource according to said solution template;
   wherein selecting a resource within a computing infrastructure comprises evaluating and selecting between alternative resources based upon a measure of an environmental impact associated with using a selected one of said alternative resources in the solution.

2. The method of claim 1, further comprising searching said computer infrastructure for an available physical resource which matches at least one of said requirements.

3. The method of claim 1, wherein at least a portion of said requirements are contained within Standard Operating Unit (SOU) pattern, said SOU pattern defining a processor capability and a memory capacity of said computing element.

4. The method of claim 1, further comprising reserving said resource.

5. The method of claim 1, further comprising setting a reservation start date and a reservation end date for a selected resource.

6. The method of claim 5, wherein said reservation start date and said reservation end data are criteria for selecting said resource defined in said template.

7. The method of claim 1, wherein said environmental impact being measured by at least one of: a source of electrical energy consumed by said particular resource, an energy consumption efficiency of said particular resource, and a carbon footprint associated with said particular resource.

8. The method of claim 1, wherein one of said alternative resources is selected based on a cost associated with deploying said solution using a particular resource.

9. The method of claim 1, further comprising:
creating a plurality of alternative deployment plans according to said solution template, each deployment plan using a different set of resources; and
comparing said plurality of deployment plans to select one of said deployment plans.

10. The method of claim 1, further comprising defining monitored parameters, ranges, and actions to be taken when monitored parameters deviate from said ranges.

11. The method of claim 10, further comprising:
monitoring said computing resources according to said monitoring parameters;
taking said action when said monitored parameters depart from said ranges.

12. The method of claim 10, wherein said monitoring parameters comprise a measure of an environmental impact of operating said resource, said environmental impact being measured by at least one of: a source of electrical energy consumed by said resource, an energy consumption efficiency of said resource, and a carbon footprint associated with said resource.

13. The method of claim 1, wherein at least a portion of said computing resources comprise virtual computing machines.

14. A system for allocating resources in a distributed computing environment, wherein a desired solution is to be implemented using said resources of said distributed computing environment, said system comprising:
a computing device hosting a database of solution templates, each solution template in said database specifying minimum computing resources needed for a particular solution to be deployed and a procedure for deploying said solution to said computing resources,
wherein said computing device, when operated:
selectively provides a solution template corresponding to said desired solution; and
identifies resources in said computing environment that match said resources specified in a selected solution template from said database;
wherein identifying a resource within said computing environment comprises evaluating and selecting between alternative resources based upon a measure of an environmental impact associated with using a selected one of said alternative resources in the desired solution.

15. The system of claim 14, further comprising a user interface that allows a user to select between alternative resources that match a resource specified in said selected solution template.

16. The system of claim 15, further comprising a comparison module that compares said alternative resources based on specified criteria and displays results of said comparison in said user interface.

17. The system of claim 14, further comprising a reservation module that accepts reservations through said user interface for selected resources to be used in deploying said desired solution.

18. A computer program product for allocating resources in a distributed computing environment, the computer program product comprising:
a non-transmissible computer readable storage medium having computer usable program code embodied therewith, the computer usable program code comprising:
computer usable program code configured to supply a solution template, said solution template specifying minimum computing resources necessary for deploying a solution and a procedure for deploying said solution to computing resources;
computer usable program code configured to search a computer infrastructure for available resources capable of conforming to said minimum computing resources specified by said solution template;
computer usable program code configured to compare and allow a user to select between alternative resources capable of conforming to a resource specified by said solution template;
wherein selecting a resource comprises evaluating and selecting between alternative resources based upon a measure of an environmental impact associated with using a selected one of said alternative resources in the solution.

* * * * *